Figure 1:
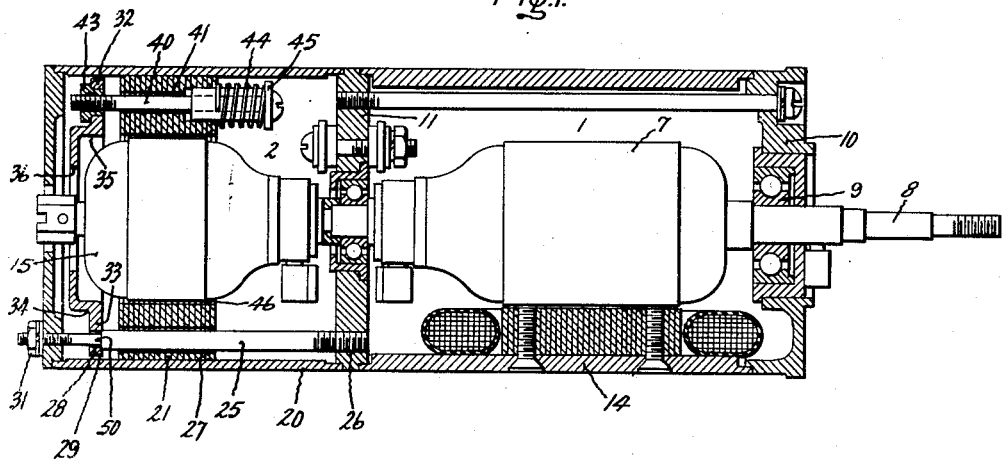

July 1, 1952     I. E. ROSS ET AL     2,602,098

AUTOMATIC KEEPER FOR PERMANENT MAGNETS

Filed May 15, 1951

Inventors:
Irvine E. Ross,
Robert P. Loveland,
by Ernest C. Britton
Their Attorney.

Patented July 1, 1952

2,602,098

UNITED STATES PATENT OFFICE 2,602,098

AUTOMATIC KEEPER FOR PERMANENT MAGNETS

Irvine E. Ross and Robert P. Loveland, Fort Wayne, Ind., assignors to General Electric Company, a corporation of New York Application May 15, 1951, Serial No. 226,398

1 Claim. (Cl. 171—209)

Our invention relates to dynamoelectric machines employing permanent magnets as a source of field excitation and more particularly to keepers for such magnets which make possible the utilization and the conservation of a greater portion of the maximum magnetic energy available in the permanent magnets.

When an electric current traverses a coil linked with a closed or nearly closed metallic magnet circuit, a magnetic flux is set up in the metallic circuit. If materials having magnetic retentive properties are used, a large portion of the magnetic flux will persist so long as the magnetic circuit remains unchanged, even when the current in the coil is discontinued; however if the magnetic circuit is interrupted, even momentarily, the residual flux falls to a much lower value, and cannot be restored by merely reclosing the interrupted magnetic circuit. It is apparent, then, that where permanent magnets are used as the source of field excitation in a dynamoelectric machine, as for example in a tachometer generator, either the machine must be designed to use only a small fraction of the available magnetic energy or the magnets must be reenergized each time that the machine is disassembled, unless an alternate flux path, or keeper, is used to establish an auxiliary magnetic circuit before the principal magnetic circuit formed in the dynamoelectric machine is interrupted. To assure that the keeper will provide such a magnetic circuit before the normal magnetic circuit through the machine is interrupted, it is desirable that the keeper be arranged to operate automatically upon disassembly of the machine.

It is an object of our invention to provide a suitable keeper which will operate automatically for conserving available magnetic energy of a permanent magnet.

It is a further object of our invention to provide a dynamoelectric machine having permanent magnet field excitation and being provided with a keeper element which is operable automatically to maintain this excitation.

A still further object of our invention is to provide a dynamoelectric machine having a permanent magnet stator utilizing a keeper for conserving the magnetic energy which is automatically made inoperative upon the assembly of the stator in the machine without causing an end thrust on the rotor of the machine.

Further objects and advantages of our invention will become apparent and our invention will be better understood from the following description referring to the accompanying drawing, and the features of novelty which characterize our invention will be pointed out with particularity in the claims annexed to and forming part of this specification.

In accordance with one form of our invention, a rotor for a generator having a permanent magnet stator is assembled in place on the shaft extension of a motor. A pair of studs, threaded in tapped holes in the end flange of the motor, are inserted through holes in the pole of the stator. Shoulders on these studs engage the lips of corresponding holes in a keeper providing an auxiliary flux path between the stator poles, causing the keeper to be separated from the stator poles by a large air gap upon the assembly of the stator over the rotor. Upon removal of the stator, the magnetic attraction of the magnets, supplemented if necessary by spring force, causes the keeper to approach the pole pieces automatically before the magnetic circuit through the rotor is interrupted.

Figure 2:
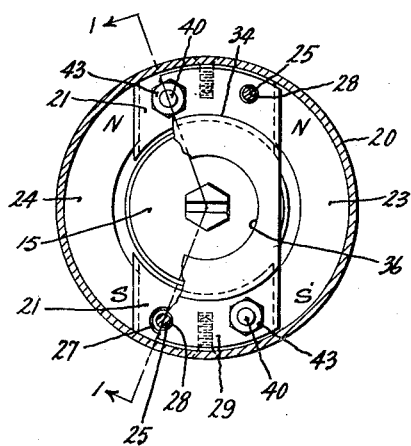

In the drawing, Fig. 1 is a side elevational view, partly in section, illustrating one form of our invention as applied to a tachometer for a motor, taken along the line 1—1 of Fig. 2; Fig. 2 is a cross-sectional view of the stator assembly and keeper of Fig. 1, taken along the line 2—2.

Referring to the drawings, there is shown a motor 1 having a rotor 7 rigidly secured to shaft 8 which is supported in bearings 9 of end flanges 10 and 11 of the motor. A motor shell 14 envelopes the rotor 7 and supports end flanges 10 and 11. Shaft 8 extends through end flange 11 of the motor and rotor 15 is rigidly fixed thereon. Rotor 15 is adapted to being used as a rotor for a tachometer generator 2 for the motor 1.

We provide a stator assembly for the tachometer generator 2 including an outer shell 20, pole pieces 21, and a pair of permanent magnets 23 and 24 which provide the flux excitation for the tachometer generator. These permanent magnets are connected at their ends to pole pieces 21 and are energized longitudinally as represented on Fig. 2. A magnetic circuit for the flux produced by the magnets 23 and 24 is established through stator pole pieces 21, air gaps 46, and the magnetic core 16 of rotor 15. This is a path of sufficiently low reluctance to conserve the magnetic energy of the permanent magnets 23 and 24 when the tachometer is assembled.

The tachometer stator assembly is secured to motor end flange 11 by a plurality of bolts 25 which are threaded into tapped holes of motor end flange 11 as at 26. Bolts 25 extend through holes 27 in pole pieces 21 and, at a reduced diameter, through holes 28 in keeper element 29. The bolts 25 then extend through holes in cover 30 which serves as a closure for tachometer casing 20. A plurality of nuts 31 are threaded on bolts 25 to secure the tachometer stator assembly to motor end flange 11.

Keeper element 29 is adapted to have its end placed adjacent to pole pieces 21, and is provided with an offset at 34 which will result in a clearance 35 with the end turns of armature 15. A circular opening 36 is provided so that the keeper can be positioned to surround shaft 8 and is of such size as to prevent removal of rotor 15 before tachometer stator assembly is removed. A plurality of bolts 40 extend through openings 41 in pole pieces 21 and thread into self-locking nuts 43 which are pressed into keeper 29 and provide a lock for maintaining the keeper in proper alignment relative to the pole pieces. A plurality of springs 44 are positioned between pole pieces 21 and the heads 45 of the bolts. These springs exert a compressive force biasing keeper 29 toward pole pieces 21 and supplement the magnetic flux of magnets 23 in making certain that the keeper 29 will engage the faces of the pole pieces and provide a flux path for the magnetic energy of the stator immediately at the beginning of the removal of the stator from the machine. When sufficient flux is present to attract the ends 32 and 33 of the keeper toward pole pieces 21, springs 44 may be omitted.

It will be observed that each bolt 25 is provided with an offset or shoulder 50. Holes 28 in keeper 29 are of such size that shoulder 50 will not pass therethrough. With proper spacing of this shoulder with respect to end flange 11, it is apparent that shoulders 50 will engage keeper 29, displacing it to a position where it will be relatively ineffective as a flux path for the magnetic flux. It is further apparent that the interruption of the auxiliary flux path through the keeper is made after rotor core 16 is in position to provide the principal flux path of low reluctance.

If the stator assembly is removed, nuts 31 are removed from bolts 25 which, however, remain secured to end flange 11. The stator assembly is then moved axially to the left, as viewed in Fig. 1, leaving rotor 15 secured to shaft 8. As pole pieces 21 move to the left, away from core 16 of rotor 15, shoulder 50 remains fixed permitting keeper 29 to approach and contact the pole pieces under the influence of the magnets 23 and 24 and the springs 45.

From the foregoing it is apparent that we have provided an automatically operable means for conserving the available magnetic energy of a permanent magnet used in a dynamoelectric machine. It is likewise apparent that we provide means for automatically disengaging the keeper upon assembly of the machine in such a manner that no end thrust is imparted to the rotor.

While we have illustrated and described particular embodiments of our invention, modifications thereof will occur to those skilled in the art. We desire it to be understood, therefore, that our invention is not to be limited to the particular arrangements disclosed, and we intend in the appended claim to cover all modifications thereof which do not depart from the spirit and scope of our invention.

What we claim as new and desire to secure by Letters Patent of the United States is:

A dynamoelectric machine comprising a stator member including a permanent magnet for furnishing excitation flux for said machine, said stator member being mounted in a shell, a rotor member arranged within said stator member, a pair of end shield members respectively closing the ends of said shell, one of said end shield members rotatably supporting said rotor motor, a keeper member adapted to contact said permanent magnet to retain the magnetic properties thereof, a plurality of longitudinal openings formed in said stator member, a fastening member secured to said one end shield member and passing through one of said stator member openings, said one stator member opening being larger than said fastening member whereby said stator member may be moved axially with respect thereto, said fastening member being removably secured to the other of said end shield members, said fastening member passing through an opening formed in said keeper member and having a shoulder formed thereon normally engaging said keeper member to space the same from said permanent magnet, another fastening member secured to said keeper member and passing through another of said stator openings, said other opening being larger than said other fastening member whereby said other fastening member may move axially with respect to said stator member, and spring means interposed between the side of said stator member remote from said keeper member and the end of said other fastening member arranged to bias said keeper member toward said permanent magnet whereby movement of said stator member away from said one end shield member causes said keeper member to be moved against said permanent magnet.

IRVINE E. ROSS.
ROBERT P. LOVELAND.

REFERENCES CITED

The following references are of record in the file of this patent:

UNITED STATES PATENTS

| Number | Name | Date |
|---|---|---|
| 2,540,845 | Thomas | Feb. 6, 1951 |